(12) United States Patent
Yamada

(10) Patent No.: US 8,331,239 B2
(45) Date of Patent: Dec. 11, 2012

(54) NETWORK SYSTEM AND DATA TRANSFER METHOD

(75) Inventor: Kenji Yamada, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 11/874,325

(22) Filed: Oct. 18, 2007

(65) Prior Publication Data

US 2008/0151759 A1 Jun. 26, 2008

(30) Foreign Application Priority Data

Dec. 25, 2006 (JP) ................................ 2006-348344

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................................. 370/238; 370/395.31
(58) Field of Classification Search .................. 370/238, 370/252

See application file for complete search history.

(56) References Cited

U.S. PATENT DOCUMENTS

| | | | |
|---|---|---|---|
| 6,418,139 B1 * | 7/2002 | Akhtar ........................... | 370/356 |
| 2003/0214921 A1 | 11/2003 | Alapuranen et al. | |
| 2005/0041591 A1 * | 2/2005 | Duggi et al. ................... | 370/238 |
| 2005/0111428 A1 | 5/2005 | Orlik et al. | |
| 2006/0067213 A1 * | 3/2006 | Evans et al. ................... | 370/229 |
| 2008/0039101 A1 * | 2/2008 | Callaway ...................... | 455/445 |
| 2011/0002226 A1 * | 1/2011 | Bhatti ........................... | 370/248 |

FOREIGN PATENT DOCUMENTS

| | | |
|---|---|---|
| JP | 2005-160062 | 6/2005 |
| JP | 2005-524363 | 8/2005 |
| JP | 2005-252858 | 9/2005 |
| JP | 2005-323266 | 11/2005 |
| WO | 99/05829 | 2/1999 |
| WO | WO-03/094546 | 11/2003 |

OTHER PUBLICATIONS

European Search Report dated Mar. 17, 2008, from the corresponding European Application.
T. X. Brown, et al. "The Energy Aware Dynamic Source Routing Protocol",<draft-brown-eadsr-00.txt>, IETF Standard Working Draft, Internet Engineering Task Force, Jun. 23, 2003.
Ghania Quddus, et al. "Finding a Stable Route Through AODV by Using Route Fragility Coefficient as Metric" Networking and Services, International Conference on Silicon Valley, Jul. 2006.
Japanese Office Action mailed Oct. 18, 2011 for corresponding Japanese Application No. 2006-348344, with partial English-language translation.

* cited by examiner

*Primary Examiner* — Huy D Vu
*Assistant Examiner* — Adnan Baig
(74) *Attorney, Agent, or Firm* — Fujitsu Patent Center

(57) ABSTRACT

Upon communication nodes receiving data that is a transfer target, based on a link value corresponding to a communication quality of each communication node that has transferred the data and radio wave strength among the communication nodes, a network system calculates a total link value that indicates a quality of a communication path that is used to transfer the data. The network system determines whether the calculated total link value is greater than or equal to a threshold value and based on a determination result, transfers the data to a destination communication node.

10 Claims, 13 Drawing Sheets

FIG.4

INFORMATION PARAMETER TABLE
160a

| EVALUATION TARGET ENTRY | ENTRYWISE LINK VALUE |
|---|---|
| REMAINING BATTERY CHARGE | 9 |
| NODE CONGESTION DEGREE | 11 |
| PROCESSING CAPACITY | 13 |
| TERMINAL TYPE | 8 |
| ⋮ | ⋮ |

FIG.5

ROUTING TABLE
160c

| DESTINATION ADDRESS | TRANSFER DESTINATION ADDRESS | TOTAL LINK VALUE | DISTANCE (HOP NUMBER) | RECORDING DATE AND TIME |
|---|---|---|---|---|
| B | B | 10 | 1 | 2006/5/8/7:20 |
| C | B | 5 | 2 | 2006/5/8/9:11 |
| D | B | 3.33 | 3 | 2006/5/8/11:40 |
| ⋮ | ⋮ | ⋮ | ⋮ | ⋮ |

FIG.8

ROUTING TABLE

| DESTINATION ADDRESS | TRANSFER DESTINATION ADDRESS | TOTAL LINK VALUE | DISTANCE (HOP NUMBER) | RECORDING DATE AND TIME |
|---|---|---|---|---|
| C | C | 10 | 1 | 2006/5/8/12:30 |
| B | C | 5 | 2 | 2006/5/8/11:25 |
| A | C | 3.33 | 3 | 2006/5/8/10:30 |
| ⋮ | ⋮ | ⋮ | ⋮ | ⋮ |

NETWORK SYSTEM AND DATA TRANSFER METHOD

BACKGROUND OF THE INVENTION

1. Field of the Invention

The present invention relates to a network system that includes a plurality of nodes that include a wireless communication function and that carries out data communication via the nodes.

2. Description of the Related Art

Recently, when carrying out data communication, an ad-hoc network such as a wireless local area network (LAN) is used. The wireless LAN includes only nodes that do not necessitate access points and can be connected wirelessly. In a connection topology of the ad-hoc network, a communication frame transmitted from a source node of data is relayed by another node and transferred to serially connected adjacent nodes. Thus, a communication path is formed from the source node to a destination node.

In the ad-hoc network, because a plurality of communication paths exist from the source node to the destination node, a method is necessitated to select the optimum communication path from the multiple communication paths.

In a commonly used communication path selecting method, an adjacent node having strong radio wave strength is selected as a transfer destination of the communication frame. In another commonly used communication path selecting method, a communication path of a smaller hop number from the source node to the destination node is preferentially selected as the communication path.

However, the optimum communication path cannot be always selected by using the method that preferentially selects the adjacent node having strong radio wave strength or by using the method that preferentially selects the communication path of smaller hop number. To overcome the drawback, for example, in a method disclosed in Japanese Patent Application Laid-open No. 2005-323266, the source node controls communication evaluation values of all the nodes that are included in the ad-hoc network and determines the optimum communication path.

However, in the conventional technology mentioned earlier, because the source node needs to control the communication evaluation values of all the nodes included in the ad-hoc network, a load on the source node significantly increases.

In other words, an increase in the load on the source node necessitates resources for the source node that are higher than resources such as a processing capacity and a memory size that are required for an original communication process of the source node. Due to this, a cost of the source node substantially increases compared to a cost of normal nodes. Moreover, if the source node is battery-driven, a process that calculates the communication evaluation values of all the nodes included in the ad-hoc network, causes a sharp increase in power consumption and a reduction in operating time. Thus, the drawback mentioned earlier is further aggravated.

In other words, in the ad-hoc network, selecting the optimum communication path without putting a load on the source node and carrying out data communication is of significant importance.

SUMMARY OF THE INVENTION

It is an object of the present invention to at least partially solve the problems in the conventional technology.

A network system according to one aspect of the present invention, includes a plurality of nodes that include a wireless communication function and that carries out data communication via the nodes. The network system includes a total link value-calculating unit that calculates, upon receiving data that is a transfer target, based on link values corresponding to a communication quality of the nodes that have transferred the data and radio wave strength among the nodes, a total link value that indicates a quality of a communication path that is used to transfer the data, and a transferring processor that transfers, based on the total link value that is calculated by the total link value-calculating unit, the data to a destination node.

A data transfer method of a network system according to another aspect of the present invention, includes a plurality of nodes that include a wireless communication function and that carries out data communication via the nodes. The data transfer method includes total link value-calculating including storing in a storage device, upon receiving data that is a transfer target, link values corresponding to a communication quality of the nodes that have transferred the data and radio wave strength among the nodes, and calculating, based on the stored link values and the radio wave strength, a total link value that indicates a quality of a communication path that is used to transfer the data, and transferring, based on the total link value that is calculated at the total link value-calculating, the data to a destination node.

A computer-readable recording medium according to still another aspect of the present invention that stores therein a computer program for a network system that includes a plurality of nodes that include a wireless communication function and that carries out data communication via the nodes. The computer program causes a computer to execute total link value-calculating including storing in a storage device, upon receiving data that is a transfer target, link values corresponding to a communication quality of the nodes that have transferred the data and radio wave strength among the nodes, and calculating, based on the stored link values and the radio wave strength, a total link value that indicates a quality of a communication path that is used to transfer the data, and transferring, based on the total link value that is calculated at the total link value-calculating, the data to a destination node.

A communicator according to still another aspect of the present invention, receives data from another communicator and transfers the data. The communicator includes a total link value-calculating unit that calculates, upon receiving the data that is a transfer target, based on link values corresponding to a communication quality of communicators that have transferred the data and radio wave strength among nodes, a total link value that indicates a quality of a communication path that is used to transfer the data, and a transferring unit that transfers the data, based on the total link value that is calculated by the total link value-calculating unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic of an example of a data structure of an information parameter table;

FIG. 5 is a schematic of an example of a data structure of a routing table;

FIG. 8 is a schematic of an example of the routing table that is generated when a search request frame has reached the communication node;

DETAILED DESCRIPTION OF THE PREFERRED EMBODIMENTS

Exemplary embodiments of the network system and the data transfer method according to the present invention are explained below with reference to the accompanying drawings.

Figure 1:
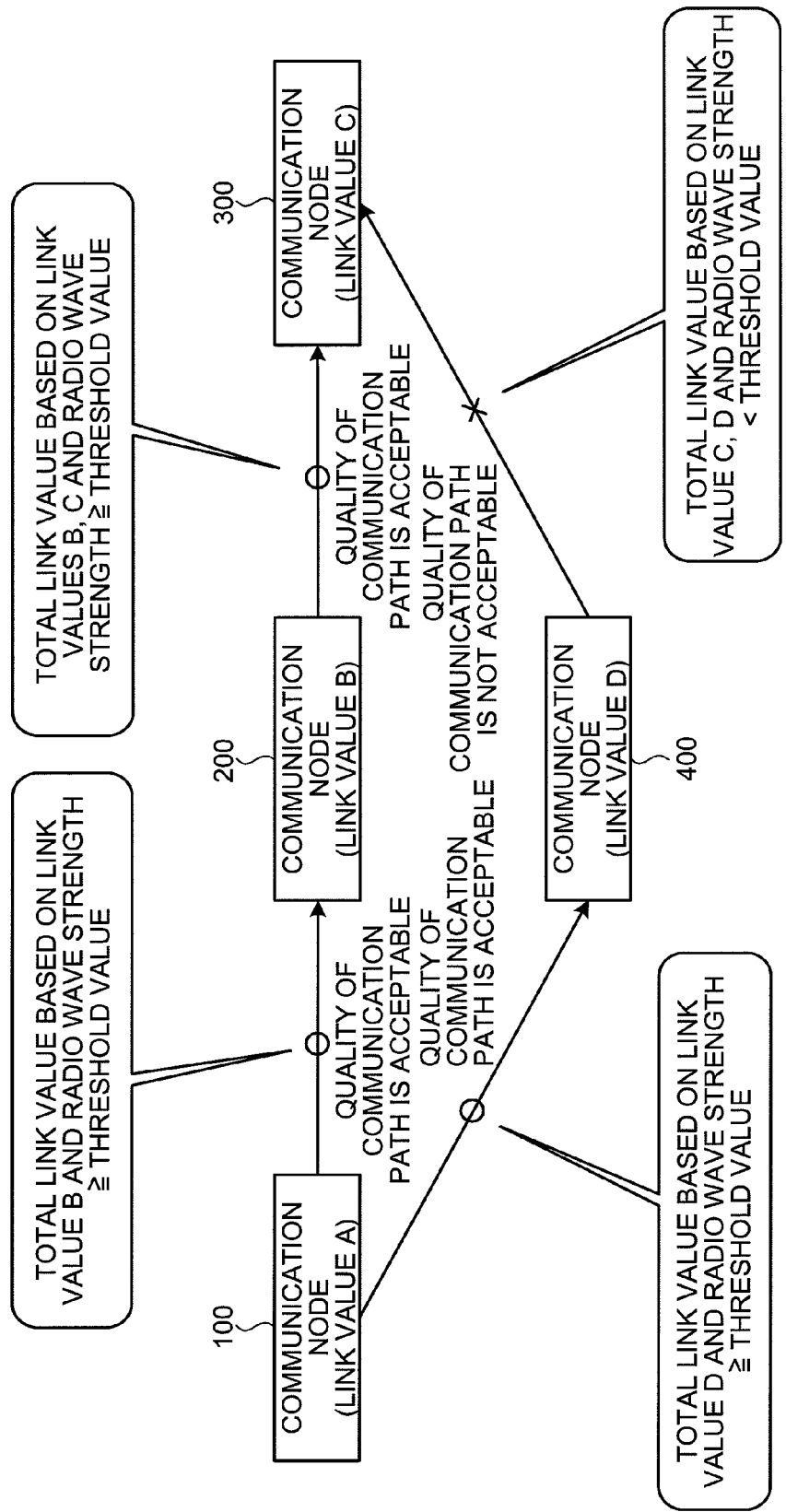
FIG. 1 is a schematic for explaining concepts of the present invention.

Concepts of the invention according to claims 1 to 5 (hereinafter, "the present invention") is explained first. FIG. 1 is a schematic for explaining the concepts of the present invention. A network system shown in FIG. 1 includes communication nodes 100 to 400 that include a wireless communication function. The network system (for example, an ad-hoc network system) carries out data communication via the communication nodes 100 to 400. For the sake of convenience for explanation, the network system shown in FIG. 1 includes the four communication nodes 100 to 400. However, the present invention is not to be thus limited, and n number (n is an integer greater than or equal to 2) of communication nodes can also be included in the network system.

The communication nodes 100 to 400 store therein a respective link value corresponding to a communication quality at the time of data communication. The link value is calculated based on a remaining battery charge of the communication node, a processing load on the communication node (includes a congestion degree of the communication node), a processing capacity of the communication node, a role of for example the communication node (indicates a role such as whether the communication node preferentially executes a data transfer related to the ad-hoc network or preferentially executes other processes. The role is set by an administrator). A link value A is set in the communication node 100, a link value B is set in the communication node 200, link value C is set in the communication node 300, and a link value D is set in the communication node 400.

A communication node that receives a communication frame that is transferred from a source communication node and that is a transfer target, calculates a total link value based on the link value of each communication node that has transferred the communication frame and radio wave strength of the adjacent communication node. The total link value indicates a quality of a communication path that is used to transfer the communication frame. Further, the communication node compares the calculated total link value to a prior set threshold value and determines whether to transfer the data. The communication nodes that receive the communication frame, sequentially execute the process mentioned earlier. Due to this, the source communication node and the destination communication node can carry out data communication using a communication path that meets or exceeds a fixed standard. The threshold value that is compared to the total link value, is prior set by the source communication node.

The communication node 100 transmitting data to the communication node 300 is explained as an example. First, the communication node 100 transmits (broadcasts, a similar usage hereinafter) the communication frame to the communication nodes 200 and 400. Based on the radio wave strength between the communication node 100 and the communication node 200 and the link value B, the communication node 200 calculates a total link value and determines whether the calculated total link value is greater than or equal to the threshold value.

Upon determining that the total link value is greater than or equal to the threshold value, the communication node 200 determines that the communication path consisting of the communication node 100 and the communication node 200 includes a quality that meets or exceeds the fixed standard, and transfers the communication frame to the communication node 300.

Upon receiving the communication frame, based on the radio wave strength among the communication nodes 100, 200, and 300 and the link values B and C, the communication node 300 calculates a total link value and determines whether the calculated total link value is greater than or equal to the threshold value. If the total link value is greater than or equal to the threshold value, because the communication path used by the communication nodes 100 to 300 to transfer data includes the quality that meets or exceeds the fixed standard, the data communication between the communication nodes 100 and 300 is carried out using the communication path.

Upon receiving the communication frame from the communication node 100, based on the radio wave strength between the communication nodes 100 and 400 and the link value D, the communication node 400 calculates a total link value, and determines whether the calculated total link value is greater than or equal to the threshold value.

If the total link value is greater than or equal to the threshold value, the communication node 400 determines that the communication path that includes the communication nodes 100 and 400, includes the quality that meets or exceeds the fixed standard, and transfers the communication frame to the communication node 300.

Upon receiving the communication frame, based on the radio wave strength among the communication nodes 100, 400, and 300 and the link values D and C, the communication node 300 calculates a total link value and determines whether the calculated total link value is greater than or equal to the threshold value. If the calculated total link value is less than the threshold value, because the communication path that uses the communication nodes 100, 400, and 300 to carry out data transfer does not meet the fixed standard, the data communication between the communication nodes 100 and 300 is not carried out using the communication path.

Thus, based on the link values of the communication nodes 100 to 400 and the radio wave strength among the respective communication nodes, the network system according to the present invention calculates the total link value that indicates the quality of the communication path. Based on the calculated total link value and the threshold value, the network system determines whether to carry out data transfer, and carries out the data transfer based on a determination result. Due to this, data communication can be carried out by selecting the optimum communication path without putting a load on the source communication node.

Figure 2:
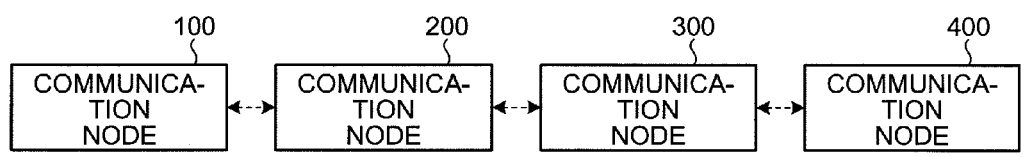
FIG. 2 is a block diagram of a structure of a network system according to an embodiment of the present invention.

Specific embodiments of the present invention are explained next. FIG. 2 is a diagram of a structure of the network system according to the present invention. As shown in FIG. 2, the network system includes the communication nodes 100 to 400 that include the wireless communication function. Although the network system shown in FIG. 2 includes the four communication nodes 100 to 400, the present invention is not to be thus limited, and n number (n is an integer greater than or equal to 2) of communication nodes can also be included in the network system.

In the example shown in FIG. 2, the communication node 100 can carry out direct wireless communication with the communication node 200, the communication node 200 can carry out direct wireless communication with the communication nodes 100 and 300, and the communication node 300 can carry out direct wireless communication with the communication nodes 200 and 400. As explained with reference to FIG. 1, when executing data communication with the communication node 400, based on the link value set in each communication node and the radio wave strength among the respective communication nodes, the communication node 100 sets the optimum communication path, and executes data communication, for example, by relaying the communication frame via the communication nodes 200 and 300.

Figure 3:
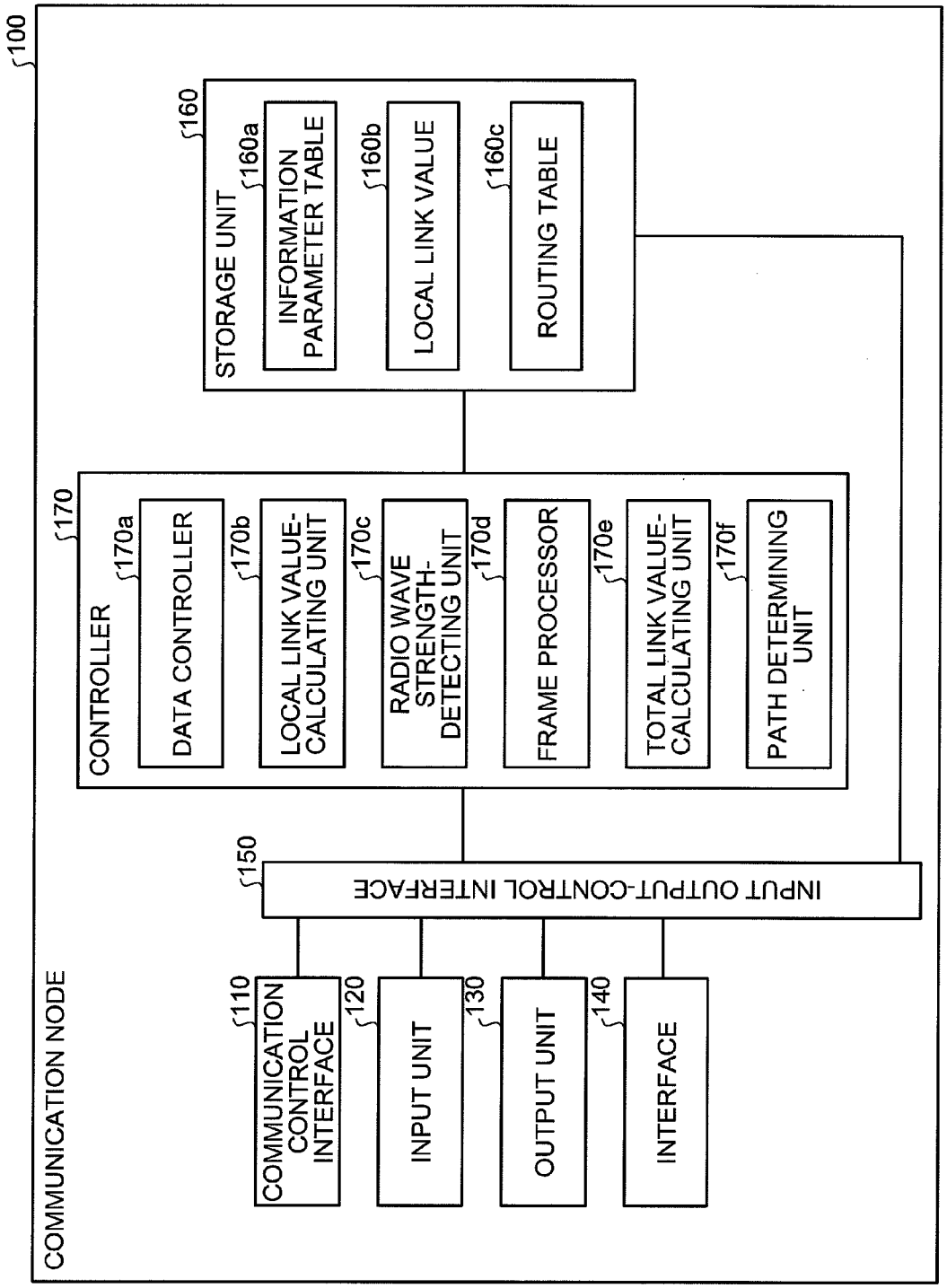
FIG. 3 is a functional block diagram of a structure of a communication node according to the embodiment.

A structure of the communication node 100 is explained next. Because structures of the communication nodes 200 to 400 are similar to the structure of the communication node 100, an explanation is omitted. FIG. 3 is a functional block diagram of the structure of the communication node 100 according to an embodiment of the present invention. As shown in FIG. 3, the communication node 100 includes a communication control interface 110, an input unit 120, an output unit 130, an interface 140, an input output-control interface 150, a storage unit 160, and a controller 170.

The communication control interface 110 carries out wireless communication by using the communication nodes included in a wireless communicable area of the communication node 100 and a predetermined communication protocol. The input unit 120 is an input unit such as a keyboard, a mouse, or a microphone that inputs various types of data.

The output unit 130 is an output unit such as a monitor (or a display, a touch panel), a speaker that outputs various types of data. The interface 140 uses a predetermined communication protocol to carry out data communication with another terminal (not shown) that is connected to the communication node 100 by a wire. The input output-control interface 150 controls input and output of data by the communication control interface 110, the input unit 120, the output unit 130, the interface 140, the storage unit 160, and the controller 170.

The storage unit 160 stores therein data and computer programs that are necessary for various processes by the controller 170. As shown in FIG. 3, the storage unit 160 includes an information parameter table 160*a*, a local link value 160*b*, and a routing table 160*c* that are especially related to the present invention.

The information parameter table 160*a* establishes and stores therein a correspondence between various entries (hereinafter, "evaluation target entry") that affect a communication quality of the communication node 100 and link values (hereinafter, "entrywise link value") that are parameters of the communication quality of each evaluation target entry. FIG. 4 is a schematic of an example of a data structure of the information parameter table 160*a*.

As shown in FIG. 4, the information parameter table 160*a* establishes and stores therein a correspondence between the evaluation target entries and the entrywise link values. The remaining battery charge indicates a remaining battery charge of the communication node 100. As shown in FIG. 4, the entrywise link value corresponding to the remaining battery charge is 9. The entrywise link value corresponding to the remaining battery charge increases with an increase in the remaining battery charge and decreases with a decrease in the remaining battery charge.

The node congestion degree indicates the processing load on the communication node 100. As shown in FIG. 4, the entrywise link value corresponding to the node congestion degree is 11. The entrywise link value corresponding to the node congestion degree increases with a decrease in the node congestion degree (for example, a decrease in the processing load on the communication node 100) and decreases with an increase in the node congestion degree (for example, an increase in the processing load on the communication node 100).

The processing capacity indicates a processing capacity of the communication node 100. As shown in FIG. 4, the entrywise link value corresponding to the processing capacity is 13. The entrywise link value corresponding to the processing capacity increases with an increase in the processing capacity and decreases with a decrease in the processing capacity.

A terminal type indicates a role of the communication node 100 (a role such as whether the communication node 100 preferentially executes a data transfer related to the ad-hoc network or preferentially executes other processes). As shown in FIG. 4, the entrywise link value corresponding to the terminal type is 8. The entrywise link value corresponding to the terminal type increases with an increase in a priority of the communication node 100 for data transfer related to the ad-hoc network. The entrywise link value corresponding to the terminal type decreases with an increase in a priority of the communication node 100 for data transfer related to other processes. The priority for data transfer related to the ad-hoc network is prior set by the administrator of the communication node 100.

The local link value 160*b* indicates a value corresponding to the communication quality of the communication node 100. To be specific, the local link value 160*b* is calculated based on the entrywise link value of each evaluation target entry that is stored in the information parameter table 160*a*. Any method can be used to calculate the local link value 160*b* from the data stored in the information parameter table 160*a*. For example, an average value of the entrywise link values can be calculated and the calculated average value can be treated as the local link value 160*b*.

The routing table 160*c* stores therein path data until the destination communication node. FIG. 5 is a schematic of an example of a data structure of the routing table 160*c*. As shown in FIG. 5, the routing table 160*c* establishes and stores therein a correspondence among a destination address, a transfer destination address, the total link value, a distance (hop number), and a recording date and time. The total link value is a value corresponding to the quality of the communication path from the source node till the destination node. The total link value is explained in detail later.

According to data that is recorded in a second row of the routing table 160c shown in FIG. 5, when transmitting data to the communication node having a destination address "C", the data needs to be transferred to the communication node having a transfer destination address "B". The total link value till the communication node having the destination address "C" is "5", the distance is "2", and the recording date and time of the data is "May 8, 2006 at 9:11".

The controller 170 includes an internal memory for storing therein various computer programs and control data that regulate various process sequences. The controller 170 uses the stored computer programs and data to execute various processes. As shown in FIG. 3, the controller 170 especially includes a data controller 170a, a local link value-calculating unit 170b, a radio wave strength-detecting unit 170c, a frame processor 170d, a total link value-calculating unit 170e, and a path determining unit 170f that are closely related to the present invention.

The data controller 170a controls the information parameter table 160a. To be specific, the data controller 170a retrieves data related to a status of the communication node 100 (the remaining battery charge, the node congestion degree, the processing capacity, and the terminal type) from each device that forms the communication node 100 (for example, a power supply, a device that controls a central processing unit (CPU) utilization). Based on the retrieved data, the data controller 170a sets and corrects the entrywise link value of each evaluation target entry that is stored in the information parameter table 160a.

If the remaining battery charge becomes greater than or equal to the threshold value, the data controller 170a adds a predetermined value to the entrywise link value corresponding to the remaining battery charge. If the remaining battery charge falls below the threshold value, the data controller 170a subtracts a predetermined value from the entrywise link value corresponding to the remaining battery charge. If the node congestion degree becomes greater than or equal to the threshold value, the data controller 170a subtracts a predetermined value from the entrywise link value corresponding to the node congestion degree. If the node congestion degree falls below the threshold value, the data controller 170a adds a predetermined value to the entrywise link value corresponding to the node congestion degree.

Further, the data controller 170a sets the respective entrywise link values according to the processing capacity and the terminal type of the communication node 100. The data controller 170a can use any method to set the entrywise link values of the processing capacity or the terminal type. For example, the data controller 170a can retrieve each entrywise link value from the administrator via the input unit 120, and set the retrieved entrywise link value in the information parameter table 160a.

Based on the entrywise link value corresponding to each evaluation target entry that is stored in the information parameter table 160a, the local link value-calculating unit 170b calculates the local link value. The local link value-calculating unit 170b can use any method to calculate the local link value. For example, an average value of the entrywise link values can be calculated and the calculated average value can be treated as the local link value. The local link value-calculating unit 170b stores the calculated local link value in the storage unit 160 (causes the local link value to be stored in the storage unit 160 as the local link value 160b).

When the communication node carries out data communication with another communication node, the radio wave strength-detecting unit 170c detects the radio wave strength between the communication node and the other communication node. To be specific, the radio wave strength-detecting unit 170c uses a received signal strength indicator (RSSI) to detect the radio wave strength among the communication nodes. The radio wave strength-detecting unit 170c outputs data of the detected radio wave strength to the total link value-calculating unit 170e.

Figure 6:
FIG. 6 is a schematic of an example of a data structure of a communication frame.

The frame processor 170d transceives the communication frame and carries out various processes related to the communication frame. FIG. 6 is a schematic of an example of a data structure of the communication frame. As shown in FIG. 6, the communication frame includes a destination address field that stores therein an address (hereinafter, "destination address") of the communication node that is a destination, a source address field that stores therein an address (hereinafter, "source address") of the communication node that is a source of the communication frame, a total link value field that stores therein the total link value, a threshold value field that stores therein the threshold value, and a data field that stores therein various data. The data field includes data of the communication path that is used to transfer the communication frame till the communication node (data corresponding to the routing table 160c shown in FIG. 5). Next, a communication frame receiving process and a communication frame transmitting process that are carried out by the frame processor 170d, are sequentially explained.

The communication frame receiving process is explained first. Upon receiving the communication frame from an external communication node, the frame processor 170d outputs data of the total link value to the total link value-calculating unit 170e and outputs data of the threshold value, the destination address, and the source address to the path determining unit 170f. If the total link value is not stored in the total link value field, the frame processor 170d outputs to the total link value-calculating unit 170e, data to the effect that the total link value is not stored.

The total link value stored in the total link value field is a value corresponding to the quality of the communication path that is used to transfer the communication frame until the communication frame is received by the frame processor 170d. The threshold value stored in the threshold value field is a value that serves as a standard for selecting the communication path. Data of the threshold value that is stored in the threshold value field, is set by the source communication node of the communication frame (if the communication node 100 is the source communication node, the frame processor 170d retrieves the threshold value set by the administrator from the input unit 120, sets the retrieved threshold value and the addresses of the destination communication node and the source communication node in the communication frame, and outputs the communication frame).

The communication frame transmitting process is explained next. If the path determining unit 170f determines to execute data transfer, the frame processor 170d retrieves the destination address and the source address from the path determining unit 170f, retrieves the total link value calculated by the total link value-calculating unit 170e, updates various data of the communication frame, and transmits the communication frame.

The total link value-calculating unit 170e calculates the total link value. A process performed by the total link value-calculating unit 170e is specifically explained. First, the total link value-calculating unit 170e calculates a link value from the radio wave strength and the local link value 160b. For example, if the radio wave strength is greater than or equal to the threshold value, the total link value-calculating unit 170e calculates the link value by adding a predetermined value to the local link value 160b. If the radio wave strength is less than the threshold value, the total link value-calculating unit 170e calculates the link value by subtracting a predetermined value from the local link value 160b.

Next, the total link value-calculating unit 170e calculates a new total link value from the link value and the total link value retrieved from the frame processor 170d. If the total link value retrieved from the frame processor 170d is treated as a first total link value and the total link value calculated from the link value and the first link value is treated as a second total link value, the second total link value can be calculated using the expression the second total link value=(the link value×the first total link value)/(the link value+the first total link value).

The total link value-calculating unit 170e outputs the calculated second total link value to the frame processor 170d. The frame processor 170d uses the second total link value to update the total link value that is stored in the total link value field. The total link value-calculating unit 170e outputs the second total link value to the path determining unit 170f.

Upon retrieving data to the effect that the total link value is not stored in the total link value field from the frame processor 170d, the total link value-calculating unit 170e outputs to the frame processor 170d and the path determining unit 170f as the second total link value, the link value that is calculated from the radio wave strength and the local link value 160b.

Based on the second total link value and the threshold value, the path determining unit 170f determines whether to transfer the communication frame. To be specific, if the second total link value is greater than or equal to the threshold value, the path determining unit 170f determines to transfer the communication frame, and outputs the determination result to the frame processor 170d. If the second total link value is less than the threshold value, the path determining unit 170f determines not to transfer the communication frame and outputs the determination result to the frame processor 170d.

Further, the path determining unit 170f retrieves the destination address and the source address, and determines whether the destination address matches with the address of the communication node 100 (it is assumed that the address of the communication node 100 is stored in the path determining unit 170f). If the address of the communication node 100 matches with the destination address, the path determining unit 170f generates a response communication frame that includes the source address as a destination and causes the frame processor 170d to output the generated response communication frame. A data structure of the response communication frame is similar to the data structure of the communication frame that is shown in FIG. 6. Next, based on information of the communication path that is stored in the data field of the communication frame, the path determining unit 170f updates the routing table 160c.

Figure 7:
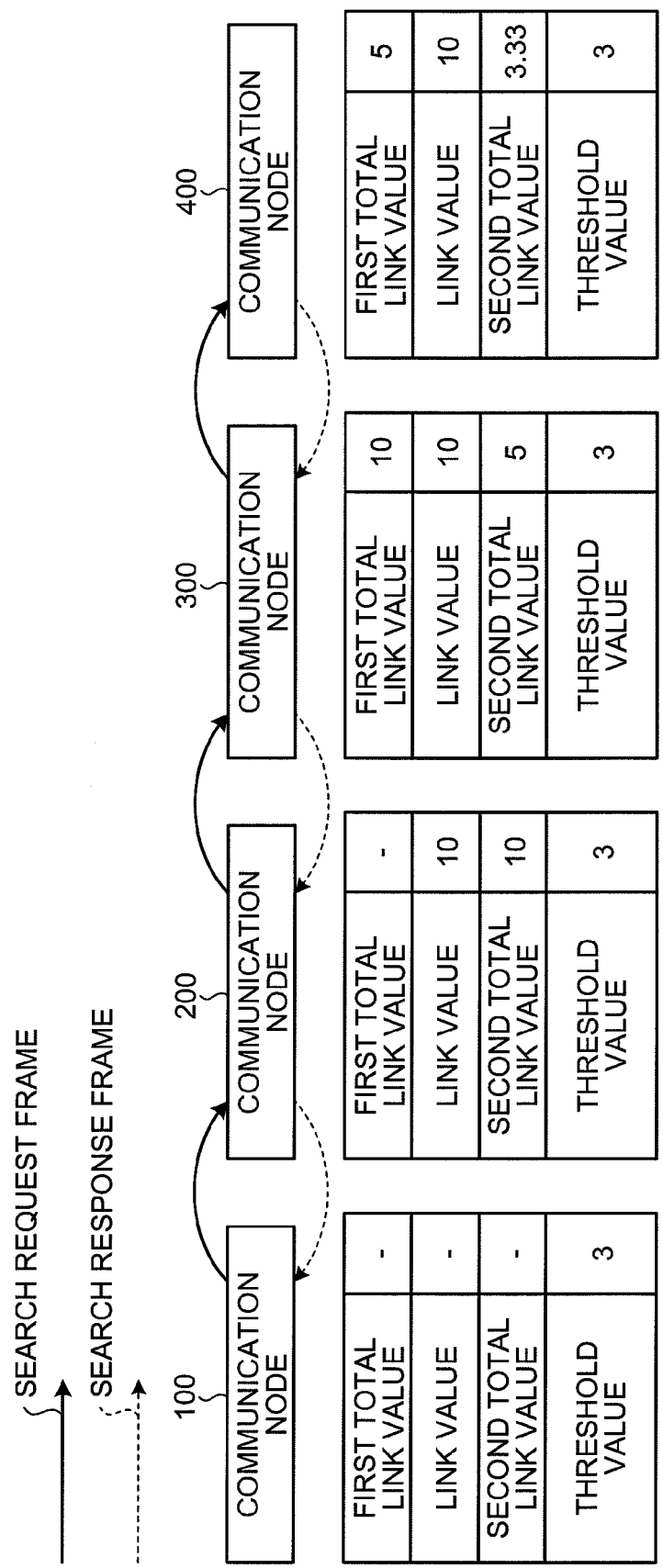
FIG. 7 is a schematic for explaining a path construction method (1) from a communication node 100 to a communication node 400.

A path construction method (1) from the communication node 100 to the communication node 400 in the network system shown in FIG. 2 is explained next. FIG. 7 is a schematic for explaining the path construction method (1) from the communication node 100 to the communication node 400. Further, as shown in FIG. 7, the communication frame that is transmitted from the communication node 100 to the communication node 400 is called a search request frame and the communication frame that is transmitted from the communication node 400 to the communication node 100 is called a search response frame. Further, it is assumed that the communication node 100 has set the threshold value of the search request frame to 3.

First, the communication node 100 sets the threshold value of the search request frame to 3 (the threshold value as 3 is merely an example), sets the address of the communication node 400 as the destination address, and broadcasts the search request frame to the communication node 200. The communication node 200 receives the search request frame from the communication node 100 and calculates the total link value.

Because the first total link value is not set when the communication node 200 receives the search request frame, the communication node 200 calculates the link value from the local link value and the radio wave strength between the communication nodes 100 and 200, and treats the calculated link value as the second total link value. If the calculated second total link value is 10, because the second total link value is greater than or equal to the threshold value 3, the communication node 200 broadcasts the search request frame.

The communication node 300 receives the search request frame from the communication node 200 and calculates the total link value. The first total link value is set to 10 when the communication node 300 receives the search request frame. The communication node 300 calculates the link value from the local link value and the radio wave strength between the communication nodes 200 and 300. If the calculated link value is 10, because the second total link value becomes 5 and the second total link value becomes greater than or equal to the threshold value 3, the communication node 300 broadcasts the search request frame.

The communication node 400 receives the search request frame from the communication node 300 and calculates the total link value. The first total link value is set to 5 when the communication node 400 receives the search request frame. The communication node 400 calculates the link value from the local link value and the radio wave strength between the communication nodes 300 and 400. If the calculated link value is 10, because the second total link value becomes 3.33 and the second total link value becomes greater than or equal to the threshold value 3, the communication node 400 accepts the search request frame.

FIG. 8 is a schematic of an example of the routing table that is generated when the search request frame has reached the communication node 400. The communication node 300 corresponds to the address C, the communication node 200 corresponds to the address B, and the communication node 100 corresponds to the address A.

Next, the communication node 400 sets the threshold value of the search response frame to 3 (the threshold value as 3 is merely an example), sets the address of the communication node 100 as the destination address, and transmits the search response frame to the communication node 300. Because a process that is used to transmit the search response frame from the communication node 300 to the communication node 100, is similar to the process mentioned earlier except that a transmitting method changes from broadcasting to unicasting, an explanation is omitted. When the search response frame is transmitted to the communication node 100, the communication path from the communication node 100 to the communication node 400 is constructed.

Figure 9:
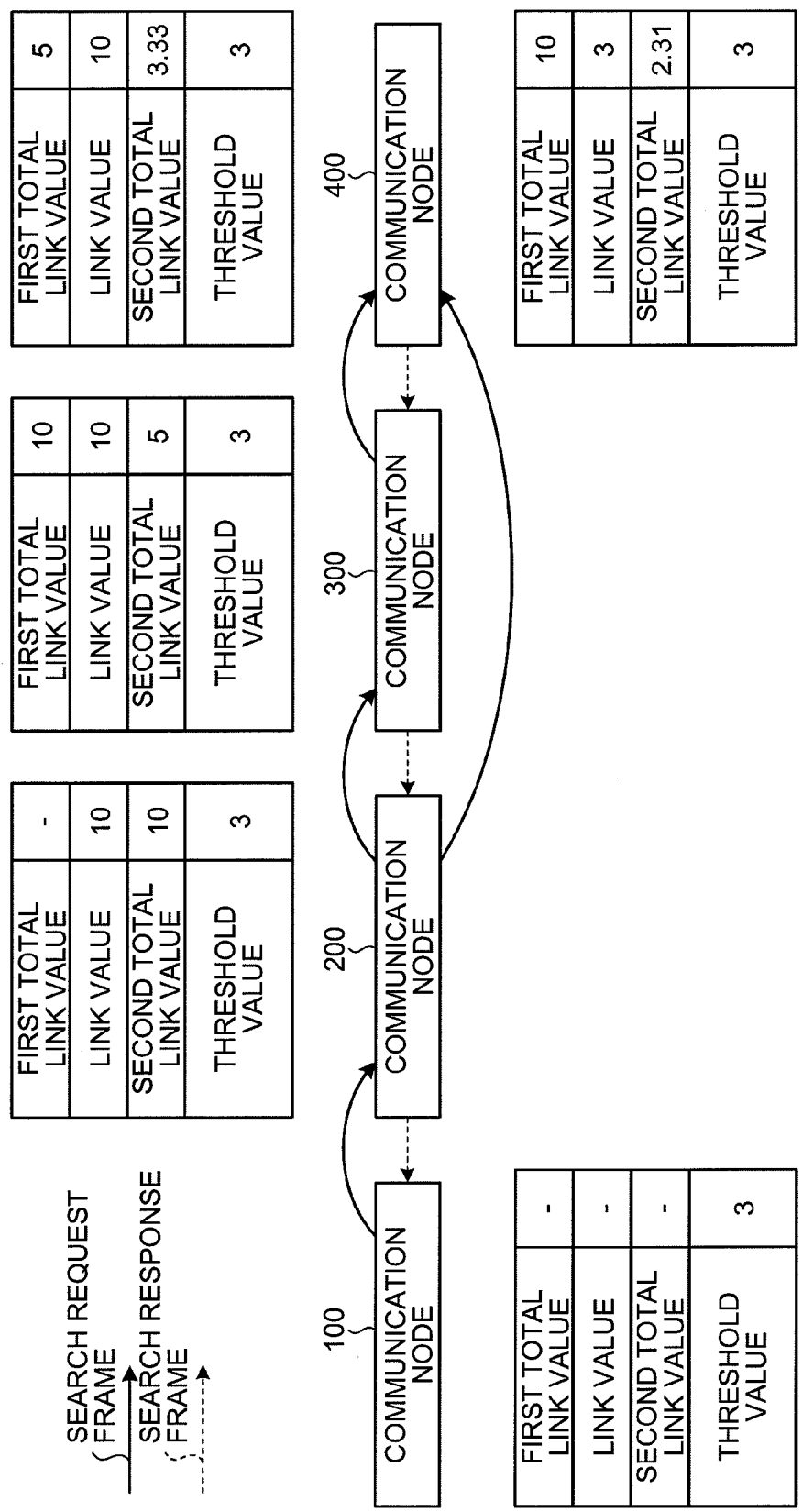
FIG. 9 is a schematic for explaining a path construction method (2) from the communication node 100 to the communication node 400.

A path construction method (2) from the communication node 100 to the communication node 400 in the network system shown in FIG. 2 is explained next. FIG. 9 is a schematic for explaining the path construction method (2) from the communication node 100 to the communication node 400. The network system shown in FIG. 9 differs from the network system shown in FIG. 2, and the communication nodes 200, 300, and 400 can carry out direct wireless communication with each other.

First, the communication node 100 sets the threshold value of the search request frame to 3 (the threshold value as 3 is merely an example), sets the address of the communication node 400 as the destination address, and broadcasts the search request frame. The communication node 200 receives the search request frame from the communication node 100 and calculates the total link value.

Because the first total link value is not set when the communication node 200 receives the search request frame, the communication node 200 calculates the link value from the local link value and the radio wave strength between the communication nodes 100 and 200, and treats the calculated link value as the second total link value. If the calculated second total link value is 10, because the second total link value is greater than or equal to the threshold value 3, the communication node 200 broadcasts the search request frame.

The communication node 300 receives the search request frame from the communication node 200 and calculates the total link value. The first total link value is set to 10 when the communication node 300 receives the search request frame. The communication node 300 calculates the link value from the local link value and the radio wave strength between the communication nodes 200 and 300. If the calculated link value is 10, because the second total link value becomes 5 and the second total link value becomes greater than or equal to the threshold value 3, the communication node 300 transmits the search request frame to the communication node 400.

The communication node 400 receives the search request frame from the communication node 300 and calculates the total link value. The first total link value is set to 5 when the communication node 400 receives the search request frame. The communication node 400 calculates the link value from the local link value and the radio wave strength between the communication nodes 300 and 400. If the calculated link value is 10, because the second total link value becomes 3.33 and the second total link value becomes greater than or equal to the threshold value 3, the communication node 400 accepts the search request frame.

Next, the communication node 400 sets the threshold value of the search response frame to 3 (the threshold value as 3 is merely an example), sets the address of the communication node 100 as the destination address, and transmits the search response frame to the communication node 300. Because a process that is used to transmit the search response frame from the communication node 300 to the communication node 100, is similar to the process mentioned earlier except that a transmitting method changes from broadcasting to unicasting, an explanation is omitted. When the search response frame is transmitted to the communication node 100, the communication path from the communication node 100 to the communication node 400 is constructed.

The communication node 400 receives the search request frame from the communication node 200 and calculates the total link value. The first total link value is set to 10 when the communication node 400 receives the search request frame. The communication node 400 calculates the link value from the local link value and the radio wave strength between the communication nodes 200 and 400. If the calculated link value is 3 (because a distance between the communication nodes 200 and 400 is long, the radio wave strength reduces, and the link value subsequently reduces), because the second total link value becomes 2.31 and the second total link value becomes less than the threshold value 3, the communication node 400 discards the search request frame that is directly transmitted from the communication node 200.

Thus, regardless of the multiple communication paths, based on the total link value that is calculated for each communication node that has transferred the search request frame, the optimum communication path is selected and a path construction between the communication nodes can be effectively executed.

Figure 10:
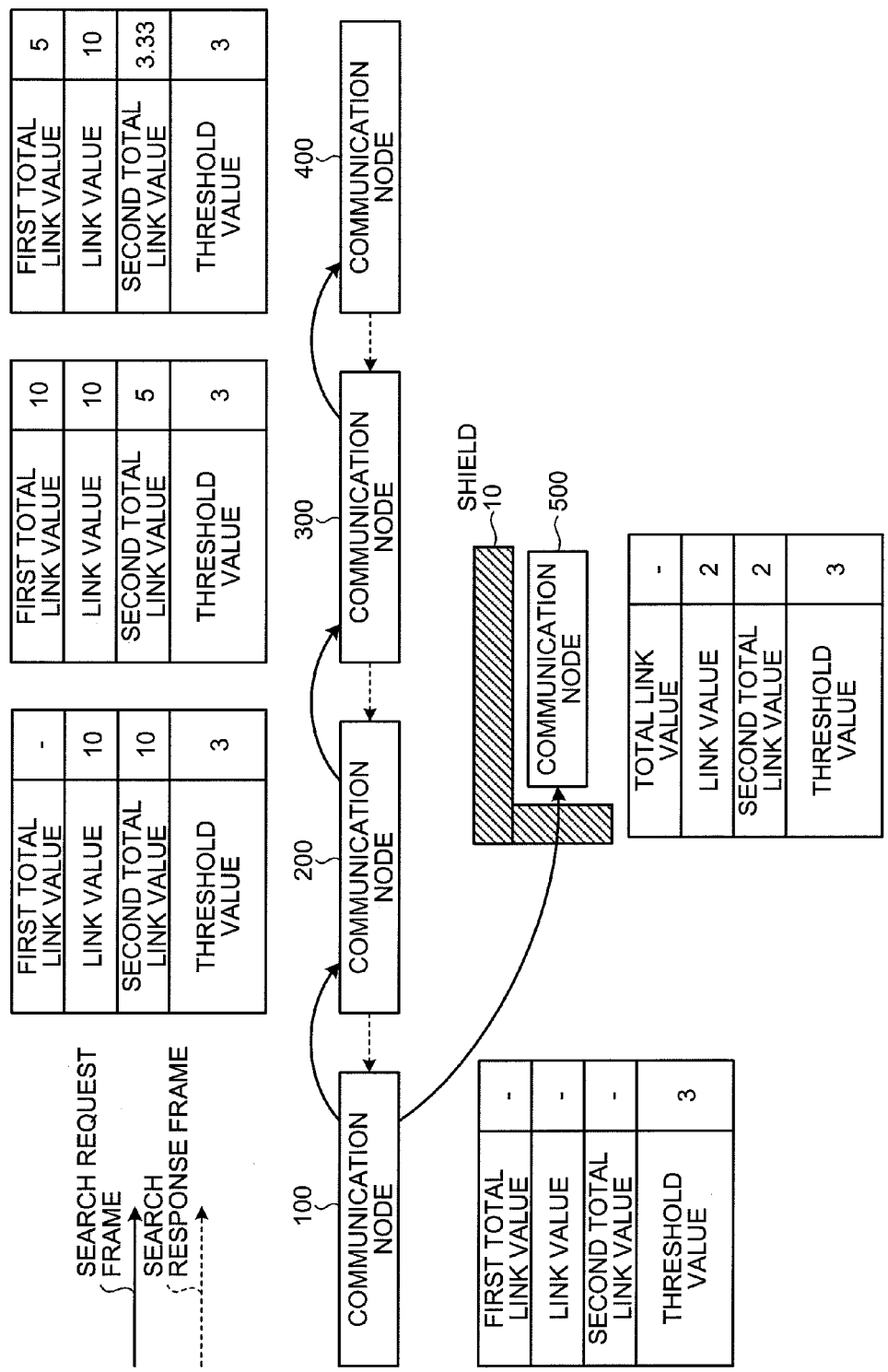
FIG. 10 is a schematic for explaining a path construction method (3) from the communication node 100 to the communication node 400.

A path construction method (3) from the communication node 100 to the communication node 400 in the network system shown in FIG. 2 is explained next. FIG. 10 is a schematic for explaining the path construction method (3) from the communication node 100 to the communication node 400. The network system shown in FIG. 10 differs from the network system shown in FIG. 2. The network system shown in FIG. 10 further includes a communication node 500 and the search request frame can be transmitted from the communication node 100 to the communication node 500 using direct wireless communication via a shield 10.

First, the communication node 100 sets the threshold value of the search request frame to 3 (the threshold value as 3 is merely an example), sets the address of the communication node 400 as the destination address, and broadcasts the search request frame. The communication node 200 receives the search request frame from the communication node 100 and calculates the total link value.

Because the first total link value is not set when the communication node 200 receives the search request frame, the communication node 200 calculates the link value from the local link value and the radio wave strength between the communication nodes 100 and 200, and treats the calculated link value as the second total link value. If the calculated second total link value is 10, because the second total link value is greater than or equal to the threshold value 3, the communication node 200 broadcasts the search request frame.

The communication node 300 receives the search request frame from the communication node 200 and calculates the total link value. The first total link value is set to 10 when the communication node 300 receives the search request frame. The communication node 300 calculates the link value from the local link value and the radio wave strength between the communication nodes 200 and 300. If the calculated link value is 10, because the second total link value becomes 5 and the second total link value becomes greater than or equal to the threshold value 3, the communication node 300 broadcasts the search request frame.

The communication node 400 receives the search request frame from the communication node 300 and calculates the total link value. The first total link value is set to 5 when the communication node 400 receives the search request frame. The communication node 400 calculates the link value from the local link value and the radio wave strength between the communication nodes 300 and 400. If the calculated link value is 10, because the second total link value becomes 3.33 and the second total link value becomes greater than or equal to the threshold value 3, the communication node 400 accepts the search request frame.

Next, the communication node 400 sets the threshold value of the search response frame to 3 (the threshold value as 3 is merely an example), sets the address of the communication node 100 as the destination address, and transmits the search response frame to the communication node 300. Because a process that is used to transmit the search response frame from the communication node 300 to the communication node 100, is similar to the process mentioned earlier except that a transmitting method changes from broadcasting to unicasting, an explanation is omitted. When the search response frame is transmitted to the communication node 100, the communication path from the communication node 100 to the communication node 400 is constructed.

The communication node 500 receives the search request frame from the communication node 100 and calculates the total link value. Because the first total link value is not set when the communication node 500 receives the search request frame, the communication node 500 calculates the link value from the local link value and the radio wave strength between the communication nodes 100 and 500 and treats the calculated link value as the second total link value. If the calculated second total link value is 2 (because the shield 10 is arranged between the communication nodes 100 and 500, the radio wave strength reduces and the link value subsequently reduces), because the second total link value becomes 2 and the second total link value becomes less than the threshold value 3, the communication node 500 discards the search request frame that is transmitted from the communication node 100.

Thus, regardless of the multiple communication paths, based on the total link value that is calculated for each communication node that has transferred the search request frame, the optimum communication path that does not include a shield etc. is selected and the path construction between the communication nodes can be effectively executed.

Figure 11:
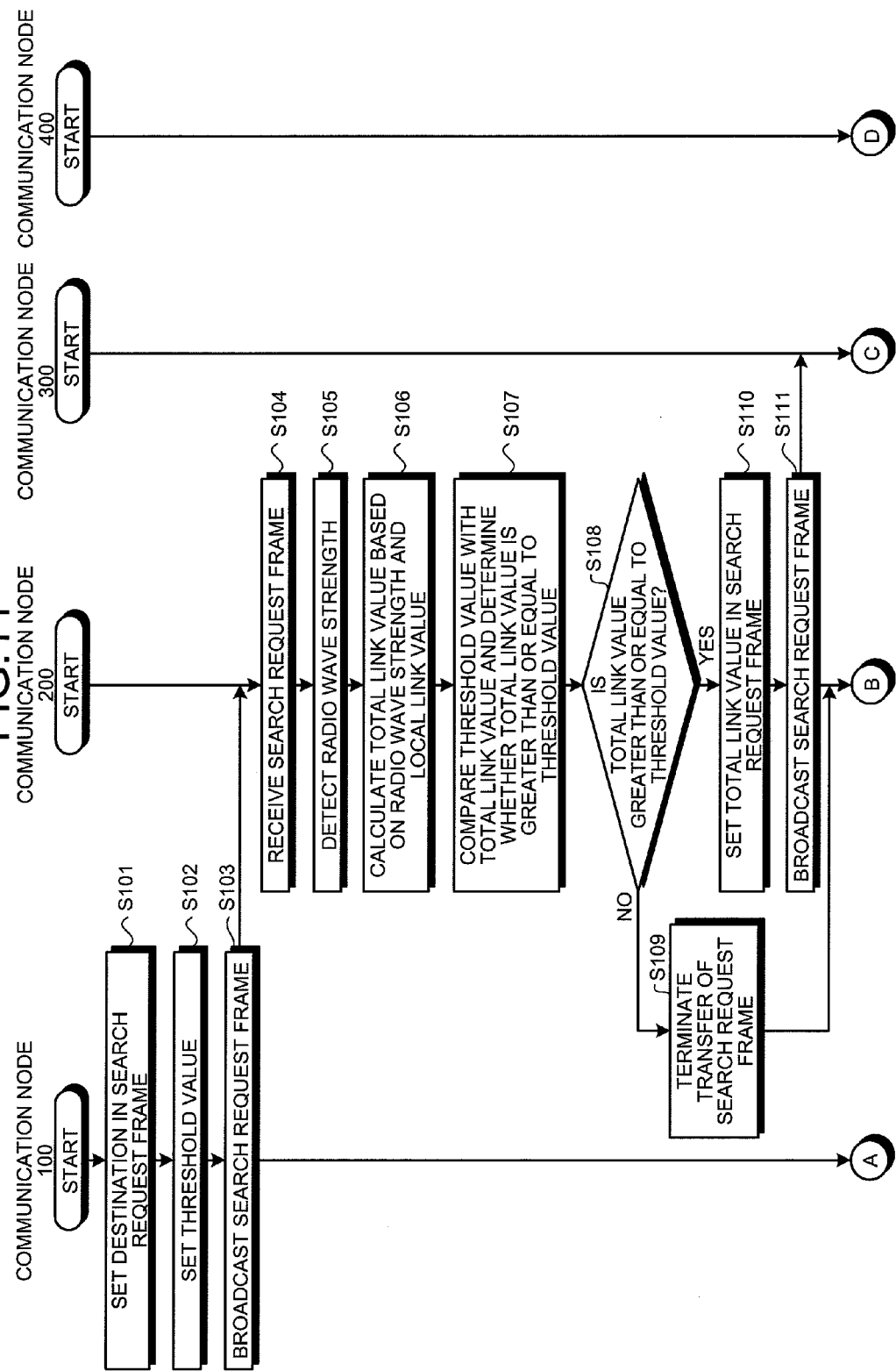
FIG. 11 is a first flowchart of a process performed by the network system according to the embodiment.
Figure 12:
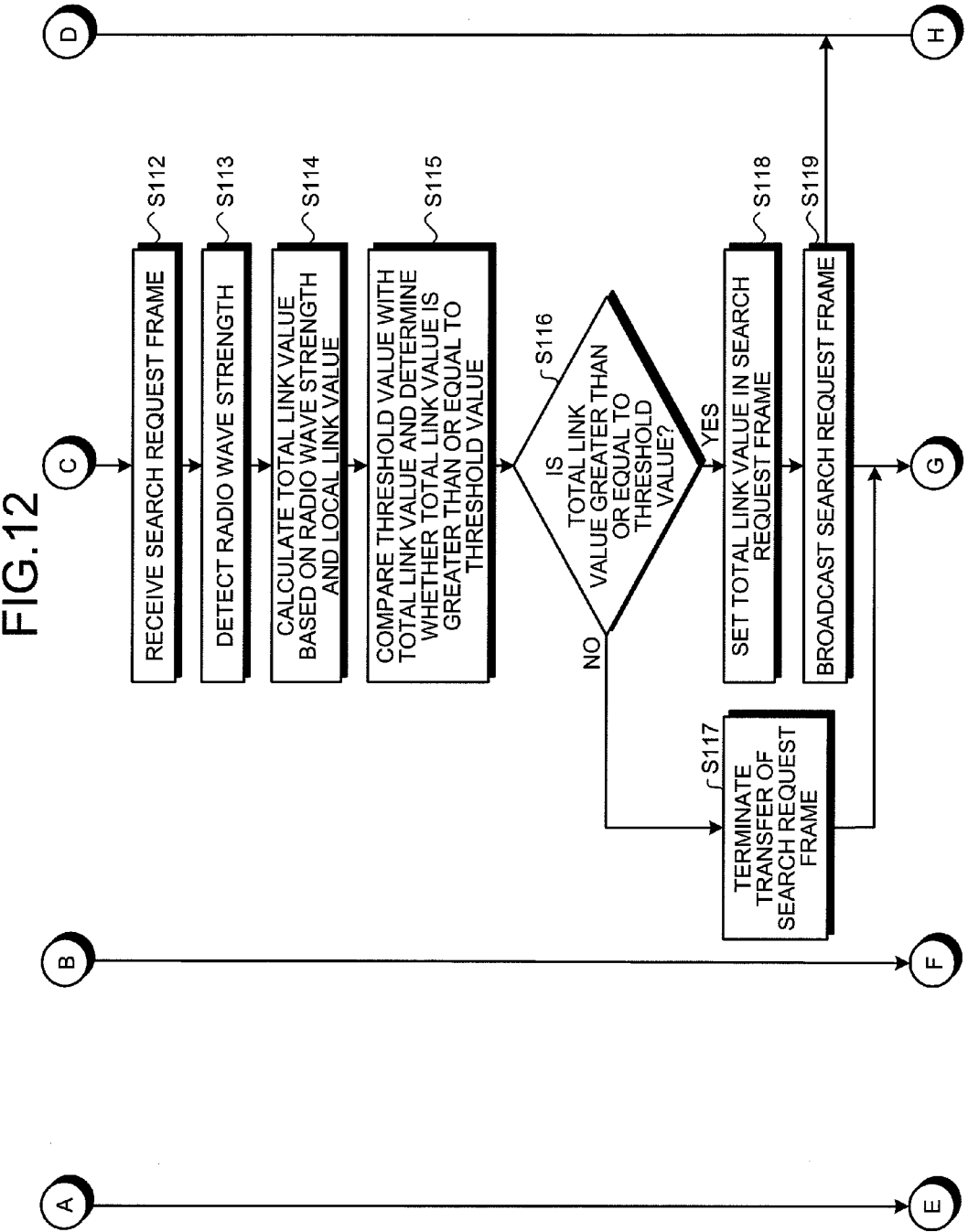
FIG. 12 is a second flowchart of the process performed by the network system according to the embodiment.
Figure 13:
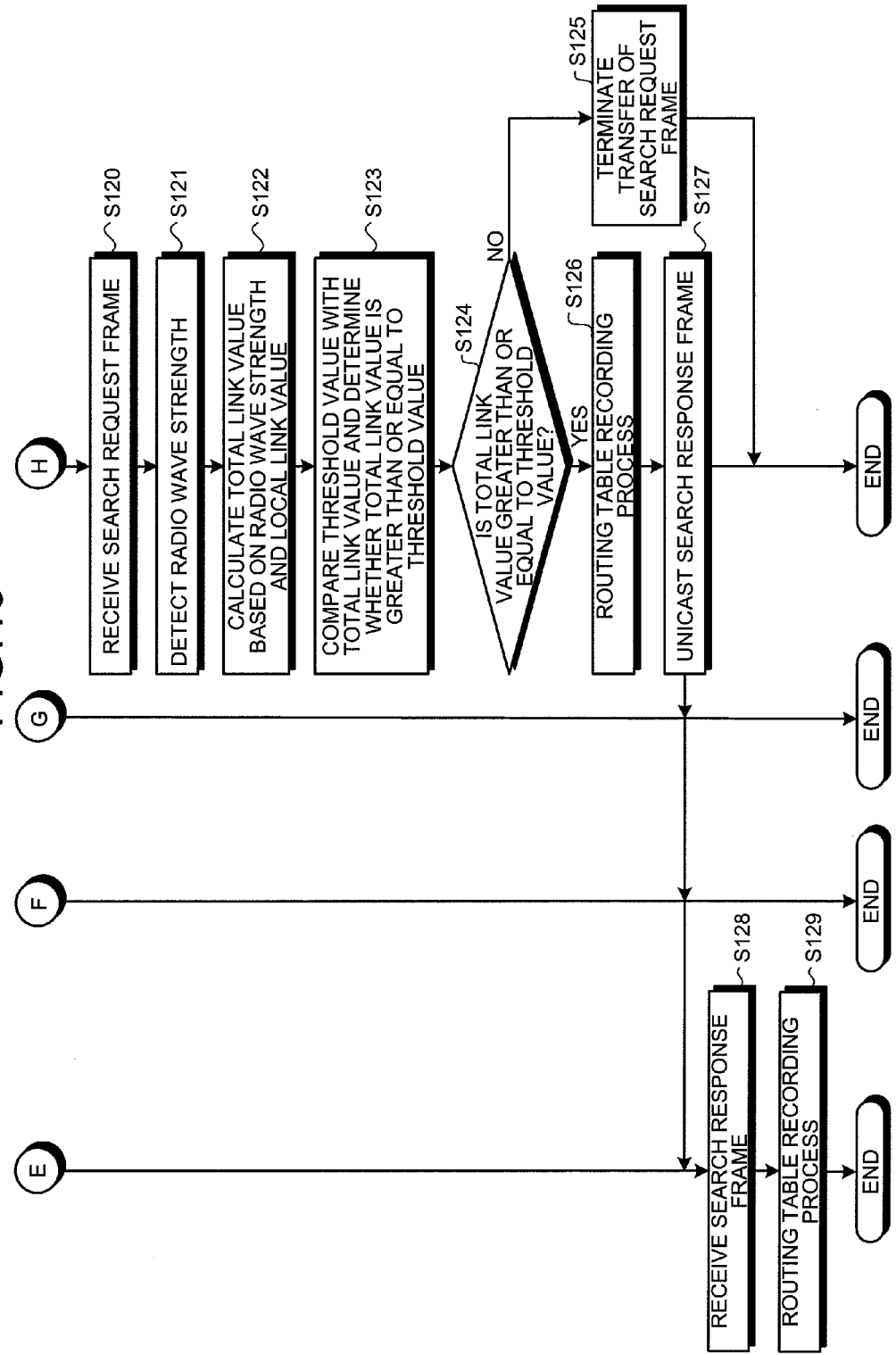
FIG. 13 is a third flowchart of the process performed by the network system according to the embodiment.

A sequence of a process performed by the network system according to the embodiment is explained next. FIGS. 11 to 13 are flowcharts of the process performed by the network system according to the embodiment. In an example explained with reference to FIGS. 11 to 13, the communication node 100 transmits the communication frame to the communication node 400 via the communication nodes 200 and 300.

As shown in FIGS. 11 to 13, the communication node 100 sets a destination in the search request frame (step S101), sets the threshold value (step S102), and broadcasts the search request frame (step S103).

The communication node 200 receives the search request frame (step S104), detects the radio wave strength (step S105), and calculates the total link value based on the local link value and the radio wave strength (step S106).

The communication node 200 compares the threshold value and the total link value and determines whether the total link value is greater than or equal to the threshold value (step S107). If the total link value is less than the threshold value (No at step S108), the communication node 200 terminates the transfer of the search request frame (step S109).

Upon determining that the total link value is greater than or equal to the threshold value (Yes at step S108), the communication node 200 newly sets the total link value in the search request frame (step S110) and broadcasts the search request frame (step S111).

Next, the communication node 300 receives the search request frame (step S112), detects the radio wave strength (step S113), and calculates the total link value based on the local link value and the radio wave strength (step S114).

The communication node 300 compares the threshold value and the total link value and determines whether the total link value is greater than or equal to the threshold value (step S115). If the total link value is less than the threshold value (No at step S116), the communication node 300 terminates the transfer of the search request frame (step S117).

Upon determining that the total link value is greater than or equal to the threshold value (Yes at step S116), the communication node 300 newly sets the total link value in the search request frame (step S118) and broadcasts the search request frame (step S119).

Next, the communication node 400 receives the search request frame (step S120), detects the radio wave strength (step S121), and calculates the total link value based on the local link value and the radio wave strength (step S122).

The communication node 400 compares the threshold value and the total link value and determines whether the total link value is greater than or equal to the threshold value (step S123). If the total link value is less than the threshold value (No at step S124), the communication node 400 terminates the transfer of the search request frame (step S125).

Upon determining that the total link value is greater than or equal to the threshold value (Yes at step S124), the communication node 400 carries out a routing table recording process (step S126) and unicasts a search response frame (step S127).

The search response frame that is transmitted from the communication node 400, is transmitted to the communication node 100 via the communication nodes 300 and 200. The communication node 100 receives the search response frame (step S128) and carries out the routing table recording process (step S129).

Based on the total link value, the local link value, and the radio wave strength that are stored in the communication frame (the search request frame or the search response frame), the communication nodes 100 to 400 select the optimum communication path. Thus, data communication can be carried out by selecting the optimum communication path without putting a load on the source communication node.

Upon the communication nodes 100 to 400 receiving data that is a transfer target, based on the local link value corresponding to each communication node that has transferred the data and the radio wave strength among the communication nodes, the network system according to the embodiment calculates the total link value that indicates the quality of the communication path that is used to transfer the data. The network system determines whether the calculated total link value is greater than or equal to the threshold value and based on the determination result transfers the data to the destination communication node. Due to this, data communication can be carried out by selecting the optimum communication path without putting a load on the source communication node.

All the automatic processes explained in the present embodiment can be, entirely or in part, carried out manually. Similarly, all the manual processes explained in the present embodiment can be entirely or in part carried out automatically by a known method. The sequence of processes, the sequence of controls, specific names, and information including various data and parameters can be changed as required unless otherwise specified.

The constituent elements of the communication node 100 etc. that are illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used. The process functions performed by the apparatus are entirely or partially realized by the CPU or a program executed by the CPU or by a hardware using wired logic.

Figure 14:
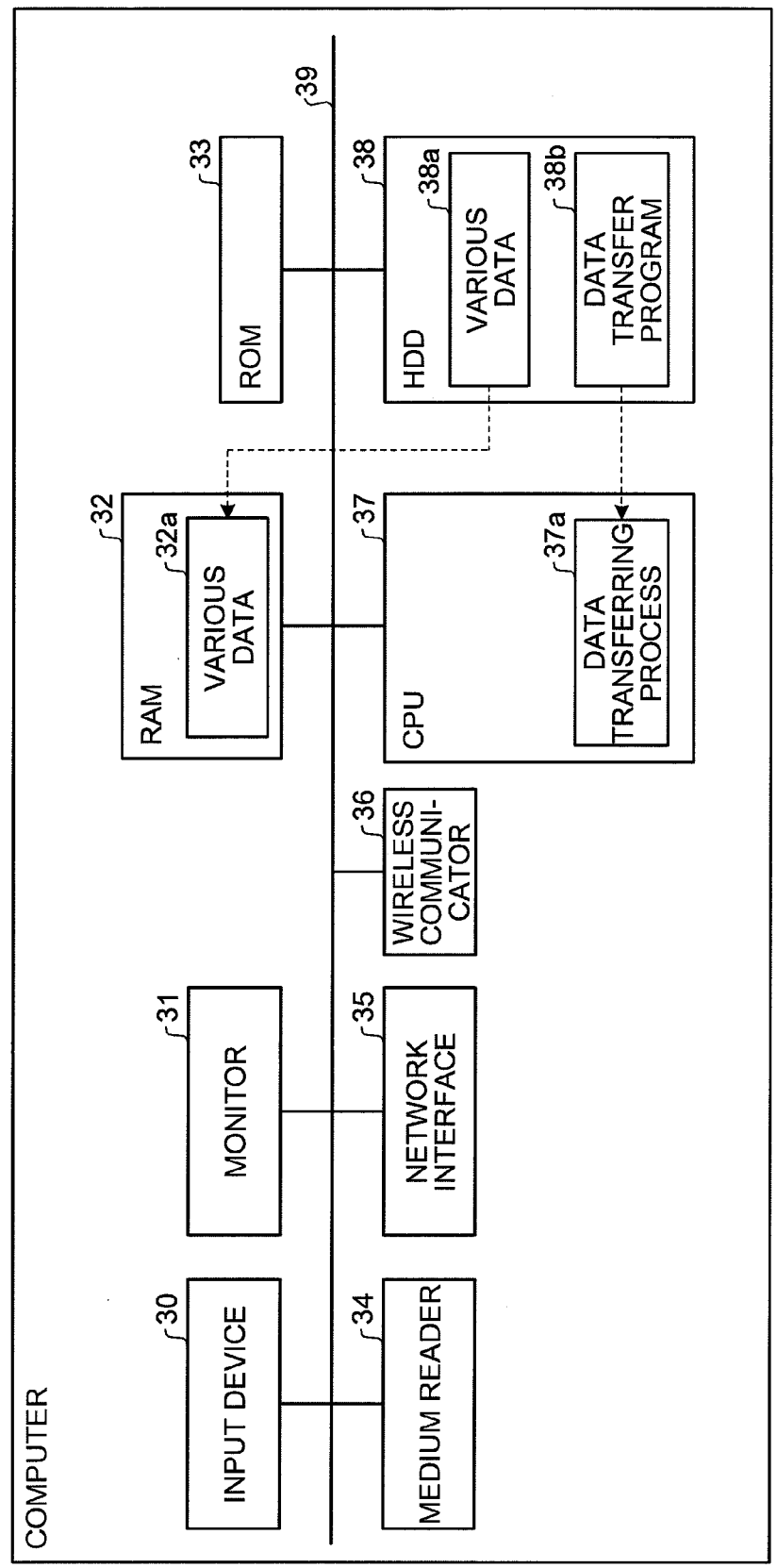
FIG. 14 is a block diagram of a hardware structure of a computer that forms the communication node shown in FIG. 3.

FIG. 14 is a block diagram of a hardware structure of a computer that forms the communication node 100 shown in FIG. 3. The computer includes an input device 30 that receives an input of data from a user, a monitor 31, a random access memory (RAM) 32, a read only memory (ROM) 33, a medium reader 34 that reads various computer programs from a recording medium that stores therein the computer programs, a network interface 35 that transceives data between the computer and another computer via a network, a wireless communicator 36 that carries out wireless communication with another communication node, a CPU 37, and a hard disk drive (HDD) 38. The monitor 31, the RAM 32, the ROM 33, the medium reader 34, the network interface 35, the wireless communicator 36, the CPU 37, and the HDD 38 are connected by a bus 39.

A data transfer program 38b that exhibits functions similar to the functions of the communication node 100, is stored in the HDD 38. The data transfer program 38b is read by the CPU 37 from the HDD 38 and executed, thus activating a data transferring process 37a that realizes the functions of functioning units of the communication node 100 mentioned earlier. The data transferring process 37a corresponds to the data controller 170a, the local link value-calculating unit 170b, the radio wave strength-detecting unit 170c, the frame processor 170d, the total link value-calculating unit 170e, and the path determining unit 170f that are shown in FIG. 3.

Further, the HDD 38 stores therein various types of data 38a that corresponds to the data that is stored in the storage unit 160 of the communication node 100. The data 38a corresponds to the information parameter table 160a, the local link value 160b, and the routing table 160c that are shown in FIG. 3. Apart from storing the data 38a in the HDD 38, the CPU 37 reads the data 38a from the HDD 38, stores the read data 38a in the RAM 32, and uses data 32a stored in the RAM 32 to execute the data transferring process.

The data transfer program 38b need not be always stored in the HDD 38 from the beginning. For example, the data transfer program 38b can be stored in a "portable physical medium" such as a flexible disk (FD), a compact disk-read only memory (CD-ROM), a digital versatile disk (DVD), a magneto optical (MO) disk, an integrated circuit (IC) card that is inserted in the computer, a "fixed physical medium" such as an HDD that can be included inside or outside the computer, or "another computer (or server)" that is connected to the computer via a public line, Internet, a local area network (LAN), a wide area network (WAN) etc. The data transfer program 38b can be read by the computer from the media mentioned earlier and executed.

According to an embodiment of the present invention, data communication can be carried out by selecting the optimum communication path without putting a load on a source node.

According to an embodiment of the present invention, a total link value that indicates a quality of the communication path that is used to transfer data, can be appropriately calculated and data communication can be carried out by selecting the optimum communication path.

According to an embodiment of the present invention, data communication can be carried out by selecting the optimum communication path.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network system that includes a plurality of nodes that include a wireless communication function and that carries out data communication via the nodes, wherein each node comprises:
   a receiving unit that receives data from another node;
   a total link value-calculating unit that calculates, based on a local link value corresponding to a communication quality of own node, first total link values corresponding to a communication quality of the nodes that have transferred the received data and radio wave strength among the nodes, and a second total link value that indicates a quality of a communication path that is used to transfer the received data;
   a determining unit that determines whether the received data is transferable data or not based on the second total link value calculated by the total link value-calculating unit; and
   a transferring processor that transfers the received data to at least one of the plurality of nodes when the determining unit determines that the received data is transferable data, wherein
   the total link value-calculating unit calculates the second total link value using an expression that the second total link value=(the local link value×the first total link value)/(the local link value+the first total link value),
   the determining unit compares a destination address of the received data and an address of the own node, and, when the destination address matches with the address of the own node, generates data including the second total link value calculated by the total link value-calculating unit and information about a communication path from a source node to the own node, and
   the transferring processor transfers the data generated by the determining unit to the source node.

2. The network system according to claim 1, wherein the first total link values are calculated based on a remaining of battery charge of the nodes, a processing load on the nodes, a processing capacity of the nodes, a role of the nodes, or the radio wave strength among the nodes that have transferred the received data.

3. The network system according to claim 1, wherein the determining unit compares the threshold value set by the source node of the data being the transfer target with the second total link value and determines whether the second total link value is greater than or equal to the threshold value, and the transferring processor transfers the data to an adjacent node when the determining unit determines that the second total link value is greater than or equal to the threshold value.

4. A data transfer method of a network system that includes a plurality of nodes that include a wireless communication function and that carries out data communication via the nodes, the data transfer method performed by each node, comprising:
   receiving data from another node;
   total link value-calculating including
   storing in a storage device, first total link values corresponding to a communication quality of the nodes that have transferred the received data and radio wave strength among the nodes, and
   calculating, based on a local link value corresponding to a communication quality of own node, the stored first total link value and the radio wave strength, and a second total link value that indicates a quality of a communication path that is used to transfer the received data;
   determining whether the received data is transferable data or not based on the second total link value calculated at the calculating; and
   transferring the received data to at least one of the plurality of nodes when the determining determines that the received data is transferable data, wherein
   the calculating includes calculating the second total link value using an expression that the second total link value=(the local link value×the first total link value)/(the local link value+the first total link value), the determining includes comparing a destination address of the received data and an address of the own node, and, when the destination address matches with the address of the own node, generating data including the second total link value calculated at the calculating and information about a communication path from a source node to the own node, and the transferring includes transferring the data generated to the source node.

5. The data transfer method according to claim 4, wherein the first total link values are calculated based on a remaining of battery charge of the nodes, a processing load on the nodes, a processing capacity of the nodes, a role of the nodes, or the radio wave strength among the nodes that have transferred the received data.

6. The data transfer method according to claim 4, wherein the determining includes:
   comparing the threshold value set by the source node of the data being the transfer target with the second total link value; and
   determining whether the second total link value is greater than or equal to the threshold value; and the transferring includes
   transferring the data to an adjacent node when the determining determines that the second total link value is greater than or equal to the threshold value.

7. A non-transitory computer-readable recording medium that stores therein a computer program for a network system that includes a plurality of nodes that include a wireless communication function and that carries out data communication via the nodes, the computer program causing a computer to execute:
   receiving data from another node;
   total link value-calculating including
      storing in a storage device, first total link values corresponding to a communication quality of the nodes that have transferred the received data and radio wave strength among the nodes, and
      calculating, based on a local link value corresponding to a communication quality of the computer, the stored first total link value and the radio wave strength, and a second total link value that indicates a quality of a communication path that is used to transfer the received data;
   determining whether the received data is transferable data or not based on the second total link value calculated at the calculating; and
   transferring the received data to at least one of the plurality of nodes when the determining determines that the received data is transferable data, wherein
   the calculating includes calculating the second total link value using an expression that the second total link value=(the local link value×the first total link value)/(the local link value+the first total link value),
   the determining includes comparing a destination address of the received data and an address of the computer, and, when the destination address matches with the address of the computer, generating data including the second total link value calculated at the calculating and information about a communication path from a source node to the computer, and
   the transferring includes transferring the data generated to the source node.

8. The non-transitory computer-readable recording medium according to claim 7, wherein the first total link values are calculated based on a remaining of battery charge of the nodes, a processing load on the nodes, a processing capacity of the nodes, a role of the nodes, or the radio wave strength among the nodes that have transferred the received data.

9. The non-transitory computer-readable recording medium according to claim 7, wherein the transferring includes:
   comparing the threshold value set by the source node of the data being the transfer target with the second total link value; and
   determining whether the second total link value is greater than or equal to the threshold value; and the transferring includes
   transferring the data to an adjacent node when the determining determines that the second total link value is greater than or equal to the threshold value.

10. A communicator that receives data from another communicator and transfers the data, comprising:
   a receiving unit that receives data from another communicator;
   a total link value-calculating unit that calculates, based on a local link value corresponding to a communication quality of the communicator, first total link value corresponding to a communication quality of other communicators that have transferred the received data and radio wave strength among nodes, and a second total link value that indicates a quality of a communication path that is used to transfer the received data;
   a determining unit that determines whether the received data is transferable data or not based on the second total link value calculated by the total link value-calculating unit; and
   a transferring processor that transfers the received data to at least one of the plurality of nodes when the determining unit determines that the received data is transferable data, wherein
   the total link value-calculating unit calculates the second total link value using an expression that the second total link value=(the local link value×the first total link value)/(the local link value+the first total link value),
   the determining unit compares a destination address of the received data and an address of the communicator, and, when the destination address matches with the address of the communicator, generates data including the second total link value calculated by the total link value-calculating unit and information about a communication path from a source node to the communicator, and
   the transferring processor transfers the data generated by the determining unit to the source node.

\* \* \* \* \*